(12) United States Patent
Hasson (10) Patent No.: US 11,310,117 B2
(45) Date of Patent: Apr. 19, 2022

(54) PAIRING OF A PROBE ENTITY WITH ANOTHER ENTITY IN A CLOUD COMPUTING ENVIRONMENT

(71) Applicant: Red Hat, Inc., Raleigh, NC (US)

(72) Inventor: Ashraf T. Hasson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/910,689

(22) Filed: Jun. 24, 2020

(65) Prior Publication Data
US 2021/0409285 A1    Dec. 30, 2021

(51) Int. Cl.
| | |
|---|---|
| *G06F 15/16* | (2006.01) |
| *H04L 12/24* | (2006.01) |
| *H04L 29/08* | (2006.01) |
| *H04L 12/26* | (2006.01) |
| *G06F 17/15* | (2006.01) |
| *H04L 41/147* | (2022.01) |
| *G06F 9/455* | (2018.01) |
| *H04L 67/10* | (2022.01) |
| *H04L 43/12* | (2022.01) |

(52) U.S. Cl.
CPC ........ *H04L 41/147* (2013.01); *G06F 9/45558* (2013.01); *H04L 43/12* (2013.01); *H04L 67/10* (2013.01); *G06F 2009/45595* (2013.01)

(58) Field of Classification Search
CPC ....... H04L 41/147; H04L 67/10; H04L 43/12; G06F 9/45558; G06F 2009/45595
See application file for complete search history.

(56) References Cited

U.S. PATENT DOCUMENTS 8,848,730 B1 *  9/2014  Vleugels ............... H04W 8/005
                                                           370/443
8,924,930 B2   12/2014  Fries
(Continued)

FOREIGN PATENT DOCUMENTS

| EP | 3800856 A1 * | 4/2021 | ........... G06F 3/0486 |
| WO | WO-2012030733 A1 * | 3/2012 | ........... H04W 8/005 |
| WO | WO-2019133763 A1 * | 7/2019 | ........... H04L 41/145 |

OTHER PUBLICATIONS

Cziva, Richard, et al., "SDN-Based Virtual Machine Management for Cloud Data Centers," IEEE Transactions on Network and Service Management, vol. 13, Issue: 2, Jun. 2016, 14 pages.
(Continued)

*Primary Examiner* — David R Lazaro
*Assistant Examiner* — Berhanu Shitayewoldetadik
(74) *Attorney, Agent, or Firm* — Withrow & Terranova, PLLC (57) ABSTRACT

A cloud orchestration system (COS) receives a request to initiate a first entity. The COS accesses configuration data that indicates the first entity is paired with a probe entity, the probe entity being configured to analyze network traffic associated with the first entity. The COS identifies a first computing host of a plurality of computing hosts on which to initiate the first entity and the probe entity. The COS causes the generation on a virtual network device of a first port and a replication port to which traffic associated with the first port is replicated. The COS causes the first entity and the probe entity to be initiated and communicatively coupled to the first port and the replication port, respectively.

20 Claims, 9 Drawing Sheets

(56) References Cited

U.S. PATENT DOCUMENTS

| | | | |
|---|---|---|---|
| 9,544,240 B1* | 1/2017 | Przygienda | H04L 45/586 |
| 10,120,710 B2 | 11/2018 | Kosugi et al. | |
| 10,237,274 B2 | 3/2019 | Balmakhtar et al. | |
| 10,455,062 B1 | 10/2019 | Balmakhtar et al. | |
| 2010/0318665 A1* | 12/2010 | Demmer | H04L 69/163 |
| | | | 709/227 |
| 2013/0304902 A1* | 11/2013 | Demmer | H04L 67/22 |
| | | | 709/224 |
| 2014/0029451 A1* | 1/2014 | Nguyen | H04L 43/12 |
| | | | 370/252 |
| 2014/0156836 A1* | 6/2014 | Demmer | H04W 4/20 |
| | | | 709/224 |
| 2015/0312275 A1* | 10/2015 | Grosskopf | G06F 21/62 |
| | | | 726/1 |
| 2016/0182336 A1* | 6/2016 | Doctor | H04L 43/062 |
| | | | 709/224 |
| 2016/0366041 A1* | 12/2016 | Seenappa | H04L 41/0806 |
| 2016/0380813 A1* | 12/2016 | Wass | H04L 67/125 |
| | | | 709/220 |
| 2017/0019344 A1* | 1/2017 | Przygienda | H04L 12/18 |
| 2017/0064021 A1* | 3/2017 | Serebro | H04M 15/41 |
| 2017/0099188 A1 | 4/2017 | Chang et al. | |
| 2017/0272951 A1* | 9/2017 | Howard | H04W 76/10 |
| 2017/0339022 A1* | 11/2017 | Hegde | G06N 3/0445 |
| 2018/0020364 A1* | 1/2018 | Wu | H04W 72/0446 |
| 2018/0109602 A1* | 4/2018 | Doctor | H04L 43/12 |
| 2018/0123940 A1* | 5/2018 | Rimar | H04L 45/02 |
| 2018/0246652 A1* | 8/2018 | Lam | G06F 3/0635 |
| 2018/0287897 A1* | 10/2018 | Brajkovic | G06F 11/3093 |
| 2018/0337852 A1* | 11/2018 | Gunalan | H04L 45/507 |
| 2019/0182144 A1* | 6/2019 | Rimar | H04L 45/02 |
| 2019/0205153 A1* | 7/2019 | Niestemski | G06F 9/5077 |
| 2019/0207818 A1* | 7/2019 | Niestemski | H04L 41/065 |
| 2019/0207860 A1* | 7/2019 | York | H04L 43/0876 |
| 2019/0260794 A1* | 8/2019 | Woodford | G06F 21/36 |
| 2019/0286469 A1* | 9/2019 | Lakshmikantha | G06F 9/45558 |
| 2019/0325739 A1* | 10/2019 | Dorum | G08G 1/096716 |
| 2019/0380037 A1* | 12/2019 | Lifshitz | H04L 43/12 |
| 2020/0034206 A1* | 1/2020 | Dimitrov | G06F 9/5083 |
| 2020/0099692 A1* | 3/2020 | Jindal | H04L 63/104 |
| 2020/0107332 A1* | 4/2020 | Huang | H04W 48/14 |
| 2020/0195528 A1* | 6/2020 | Barton | H04L 47/2475 |
| 2021/0029012 A1* | 1/2021 | Li | H04L 43/10 |
| 2021/0051517 A1* | 2/2021 | Johansson | H04W 68/005 |
| 2021/0067489 A1* | 3/2021 | Jayawardena | H04L 63/0236 |
| 2021/0255844 A1* | 8/2021 | Wang | G06F 8/63 |

OTHER PUBLICATIONS

Batalle, Josep, et al., "On the Implementation of NFV over an OpenFlow Infrastructure: Routing Function Virtualization," 2013 IEEE SDN for Future Networks and Services (SDN4FNS), Nov. 2013, 6 pages.

Chandramouli, Ramaswamy, "Secure Virtual Network Configuration for Virtual Machine (VM) Protection," NIST Special Publication 800-125B, Mar. 2016, 30 pages.

\* cited by examiner

PAIRING OF A PROBE ENTITY WITH ANOTHER ENTITY IN A CLOUD COMPUTING ENVIRONMENT

BACKGROUND

A probe entity analyzes network traffic associated with another entity, often without the knowledge or support of the other entity. A probe entity may send network traffic of the entity that meets certain criteria to one or more other applications, sometimes referred to as "north-bound" applications.

SUMMARY

The examples disclosed herein pair a probe entity with another entity in a cloud computing environment. Actions by a cloud orchestration system with respect to the entity being probed also take into consideration that the entity is paired with a probe entity and that the two entities are managed as a pair.

In one example a method is provided. The method includes receiving, by a cloud orchestration system, a request to initiate a first entity. The method further includes accessing configuration data that indicates the first entity is paired with a probe entity, the probe entity being configured to analyze network traffic associated with the first entity. The method further includes identifying a first computing host of a plurality of computing hosts on which to initiate the first entity and the probe entity. The method further includes causing, by the cloud orchestration system, the generation on a virtual network device of a first port and a replication port to which traffic associated with the first port is replicated. The method further includes causing, by the cloud orchestration system, the first entity and the probe entity to be initiated and communicatively coupled to the first port and the replication port, respectively.

In another example a cloud orchestration system is provided. The cloud orchestration system includes a memory and one or more processor devices coupled to the memory. The one or more processor devices are to receive a request to initiate a first entity. The one or more processor devices are further to access configuration data that indicates the first entity is paired with a probe entity, the probe entity being configured to analyze network traffic associated with the first entity. The one or more processor devices are further to identify a first computing host of a plurality of computing hosts on which to initiate the first entity and the probe entity. The one or more processor devices are further to cause the generation on a virtual network device of a first port and a replication port to which traffic associated with the first port is replicated. The one or more processor devices are further to cause the first entity and the probe entity to be initiated and communicatively coupled to the first port and the replication port, respectively.

In another example a non-transitory computer-readable storage medium is provided. The non-transitory computer-readable storage medium includes instructions configured to cause one or more processor devices to receive a request to initiate a first entity. The instructions are further configured to cause the one or more processor devices to access configuration data that indicates the first entity is paired with a probe entity, the probe entity being configured to analyze network traffic associated with the first entity. The instructions are further configured to cause the one or more processor devices to identify a first computing host of a plurality of computing hosts on which to initiate the first entity and the probe entity. The instructions are further configured to cause the one or more processor devices to cause the generation on a virtual network device of a first port and a replication port to which traffic associated with the first port is replicated. The instructions are further configured to cause the one or more processor devices to cause the first entity and the probe entity to be initiated and communicatively coupled to the first port and the replication port, respectively.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first entity" and "second entity," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Cloud computing environments are increasingly popular. The phrase "cloud computing environment" or "cloud computing system" as used herein refers to a system that provides automated on-demand self-service via an application programming interface (API) over a network to a shared pool of configurable computing devices used to implement requests for computing resources, such as data storage, entity execution, and database management computing resources.

A probe entity analyzes network traffic associated with another entity (sometimes referred to herein as the "probed entity"), often without the knowledge or support of the other entity. The terms "entity" and "probe entity" as used herein refer to a self-contained static or runtime environment, such as a container or a virtual machine. A container is implemented via a containerization technology, such as, by way of non-limiting example, a Docker container technology, a Kubernetes container technology, a CoreOS (Rocket) container technology, a Tectonic container technology, and the like. A virtual machine is implemented via virtual machine virtualization technology, such as, by way of non-limiting example, Red Hat Enterprise Linux virtualization technology, VMware® virtualization technology, Microsoft® Hyper-V virtualization technology, Oracle VM Server for SPARC virtualization technology, or the like.

A probe entity may send network traffic associated with the other entity that meets certain criteria to one or more other applications, sometimes referred to as "north-bound" applications. A probe entity may analyze the network traffic of the other entity for any number of reasons, such as to identify voice-related traffic and send the voice-related traffic to another destination for analysis, to help analyze issues, to aggregate certain types of information, to identify malicious actors, or the like.

There are situations when a cloud computing environment may move (e.g. migrate) an entity from one computing host to another computer host. This may happen, for example, if a computing host becomes overloaded, or faults. However, where the entity to be moved is being probed by a probe entity, the cloud computing environment is typically unaware of the relationship between the probed entity and the probe entity. Without knowledge of the probing relationship, the cloud computing environment may move the entity being probed to one computing host, and the probe entity to another computing host, and inadvertently subvert the probing process. Similarly, an operator who is unaware of the relationship between an entity being probed and the probe entity may request that an entity be initiated on a computing host without realizing that the probe entity should also be initiated.

The examples disclosed herein pair an entity with a probe entity in a cloud computing environment, such that any action by a cloud orchestration system with respect to the entity also takes into consideration that the entity is paired with a probe entity and the two entities are managed together.

For example, upon a determination that an entity that is paired with a probe entity is to be initiated on a computing host, the cloud orchestration system automatically initiates both the entity and the probe entity on the same computing host, and ensures that any necessary networking infrastructure is configured to ensure that packets associated with the entity (e.g., packets received or transmitted by the entity) are also provided to the probe entity.

Figure 1:
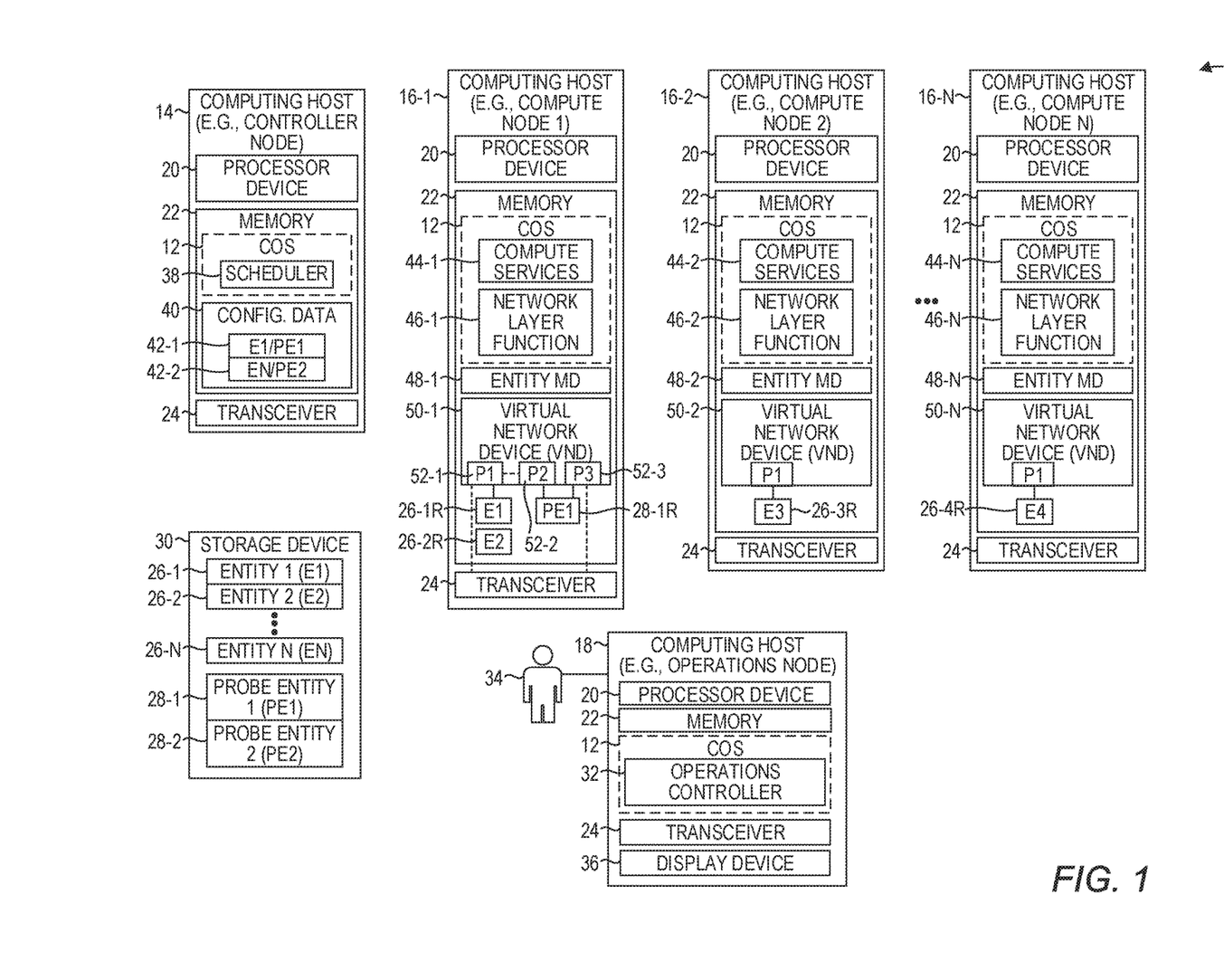
FIG. 1 is a block diagram of a cloud computing environment suitable pairing a probe entity with another entity according to one implementation.

FIG. 1 is a block diagram of a cloud computing environment 10 according to one example. The cloud computing environment 10 may comprise any type of cloud computing environment, such as, by way of non-limiting example, a public, private, and/or hybrid cloud computing environment implemented, for example, via Red Hat® OpenStack technology, Oracle® Cloud technology, Amazon® Web Services technology, Google® Cloud technology, Microsoft® Azure technology, IBM® cloud services technology, or the like.

The cloud computing environment 10 includes a distributed cloud orchestration system (COS) 12 (sometimes referred to as a cloud operating system) that executes on a plurality of computing hosts 14, 16-1-16-N (generally, computing hosts 16) and 18. While, for purposes of illustration, only three computing hosts 16 are shown, in practice the cloud computing environment 10 may comprise tens, hundreds or thousands of computing hosts 16. The COS 12 facilitates the initiation and termination of entities on the computing hosts 16 on a dynamic, as-needed basis, in accordance with predetermined conditions, and/or on an ad-hoc basis in response to requests to initiate or terminate an entity. The COS 12 may, prior to initiation of an entity, obtain information, such as resource utilization information associated with the computing hosts 16, to determine a particular computing host 16 on which to initiate an entity. Thus, in some examples, the COS 12 rather than a human identifies the computing host 16 on which to initiate an entity. While for purposes of illustration the entities and probe entities illustrated herein comprise virtual machine entities, the examples are not limited to virtual machine entities. The COS 12 may comprise any suitable cloud orchestration system, and in some implementations, the COS 12 comprises the Red Hat® OpenStack® cloud orchestration system, modified as disclosed herein to implement the functionality described herein.

Each of the computing hosts 14, 16, and 18 include one or more processor devices 20, at least one memory 22, and a transceiver 24. The transceivers 24 may comprise wireless and/or non-wireless ports for communication with a network (not illustrated). The transceivers 24 may have a finite number of physical ports for connection to a physical media such as copper wire, coaxial cable, fiber optic cable, or the like.

The entities discussed herein may have both a static implementation and a runtime implementation. The static implementations of a plurality of entities 26-1, 26-2-26-N (generally, entities 26), and probe entities 28-1, 28-2 (generally, probe entities 28), may be stored on one or more storage devices 30. As will be discussed in greater detail herein, the static entities 26 and the probe entities 28 can be initiated on the computing hosts 16 to create runtime implementations of the static entities 26 and the probe entities 28.

The entities 26, when executing, implement some desired functionality. The probe entities 28, when executing, are paired to a particular entity 26 and analyze the network traffic associated with the entity 26 with which the respective probe entity 28 is paired. The probe entity 28 may generate network traffic based on the analysis of the network traffic and transmit packets to another destination for storage or subsequent analysis. The entity 26 being probed may be unaware that the network traffic associated with the entity 26 is being probed by a probe entity 28.

The computing host 18 includes an operations controller 32 with which an operator 34 may interact to configure and otherwise interact with the COS 12. Results of commands entered by the operator 34 may be presented on a display device 36. The COS 12 on the computing host 14 includes a scheduler 38 that operates to coordinate the initiation, termination, and migration of entities among the computing hosts 16. The scheduler 38 maintains configuration data 40 about the entities 26 and the probe entities 28 that identifies whether a particular entity 26 is paired with a particular probe entity 28. In this example, an entry 42-1 indicates that the entity 26-1 is paired with the probe entity 28-1, and an entry 42-2 indicates that the entity 26-N is paired with the probe entity 28-2.

It is noted that because the scheduler 38 is a component of the computing host 14, functionality implemented by the scheduler 38 may be attributed to the computing host 14 generally. Moreover, in examples where the scheduler 38 comprises software instructions that program the processor device 20 to carry out functionality discussed herein, functionality implemented by the scheduler 38 may be attributed herein to the processor device 20.

The COS 12 on the computing host 16-1 includes a compute services 44-1 that operates to, among other things, configure, initiate, and terminate entities on the computing host 16-1, in coordination with the scheduler 38. The computing host 16-1 also includes a network layer function 46-1 that operates in conjunction with the compute services 44-1 to implement required network functionality for an entity that is initiated on the computing host 16-1. The network layer function 46-1 may comprise a software-defined network (SDN) layer, and may be part of the COS 12, or may be a separate package that executes on the computing host 16-1. The compute services 44-1 maintains entity metadata 48-1 that contains information about the entities 26 and the probe entities 28 that are executing on the computing host 16-1, including, for example, a status of the entities 26 and the probe entities 28 and whether any entities 26 are paired with any probe entities 28.

At the point in time illustrated in FIG. 1, the network layer function 46-1 has generated a virtual network device (VND) 50-1. Virtual network devices, such as the VND 50-1, may sometimes be referred to as virtual switches or virtual bridges. VNDs allow multiple different entities to share the finite number of hardware ports implemented on the transceiver 24, and in essence, virtualize networking components in the cloud computing environment 10 to more efficiently utilize the finite number of hardware ports implemented on the transceiver 24. To an entity coupled to the VND 50-1, the VND 50-1 may appear to be a conventional transceiver 24, and the entity interacts with the VND 50-1 the same way the entity would interact with the conventional transceiver 24.

The compute services 44-1 has initiated an entity 26-1R on the computing host 16-1. The entity 26-1R is a runtime implementation of the entity 26-1. The letter "R" in conjunction with an element reference number throughout the figures will be used to denote a runtime implementation of the static entity 26 or probe entity 28 that bears the same element reference number without the letter "R". The entity 26-1R is communicatively coupled to the VND 50-1 via a port 52-1. The port 52-1 is (transparent to the entity 26-1R) communicatively coupled to some physical port on the transceiver 24 of the computing host 16-1 as illustrated by a dashed line.

The compute services 44-1 has also initiated a probe entity 28-1R on the computing host 16-1. The probe entity 28-1R is coupled to the VND 50-1 via a port 52-2, which is a replicated port of the port 52-1. A replicated port is a port that receives the traffic associated with another port. In this example, the VND 50-1 provides all traffic associated with the port 52-1, such as all packets received by the probe entity 26-1R and all packets transmitted by the probe entity 26-1R, to the port 52-2, for consumption by the probe entity 28-1R, as indicated by the dashed line between the ports 52-1 and 52-2. The entity 26-1R may or may not be aware that the network traffic received and transmitted by the entity 26-1R is being provided to the probe entity 28-1R. The probe entity 28-1R is also communicatively coupled to the VND 50-1 via a port 52-3, which is communicatively coupled to some physical port on the transceiver 24 of the computing host 16-1 as illustrated by a dashed line. The probe entity 28-1R uses the port 52-3 to communicate with other entities, such as a "north-bound" application to which the probe entity 28-1R sends the packets associated with the entity 26-1R. The compute services 44-1 has also initiated an entity 26-2R on the computing host 16-1, which is not paired with a probe entity 28.

The computing hosts 16-2-16-N are configured similarly to the computing host 16-1, and include corresponding compute services 44-2-44-N, network layer functions 46-2-46-N, and entity metadata 48-2-48-N, respectively. The entity metadata 48-2-48-N contains information about the entities 26 and probe entities 28 running on the computing hosts 16-2-16-N, respectively. In this example, the network layer function 46-2 has initiated a VND 50-2 on the computing host 16-2. The compute services 44-2 has initiated an entity 26-3R, and caused the entity 26-3R to be communicatively coupled to a port on the VND 50-2. The network layer function 46-N has initiated a VND 50-N on the computing host 16-N. The compute services 44-N has initiated an entity 26-4R, and caused the entity 26-4R to be communicatively coupled to a port on the VND 50-N.

Figure 2A:
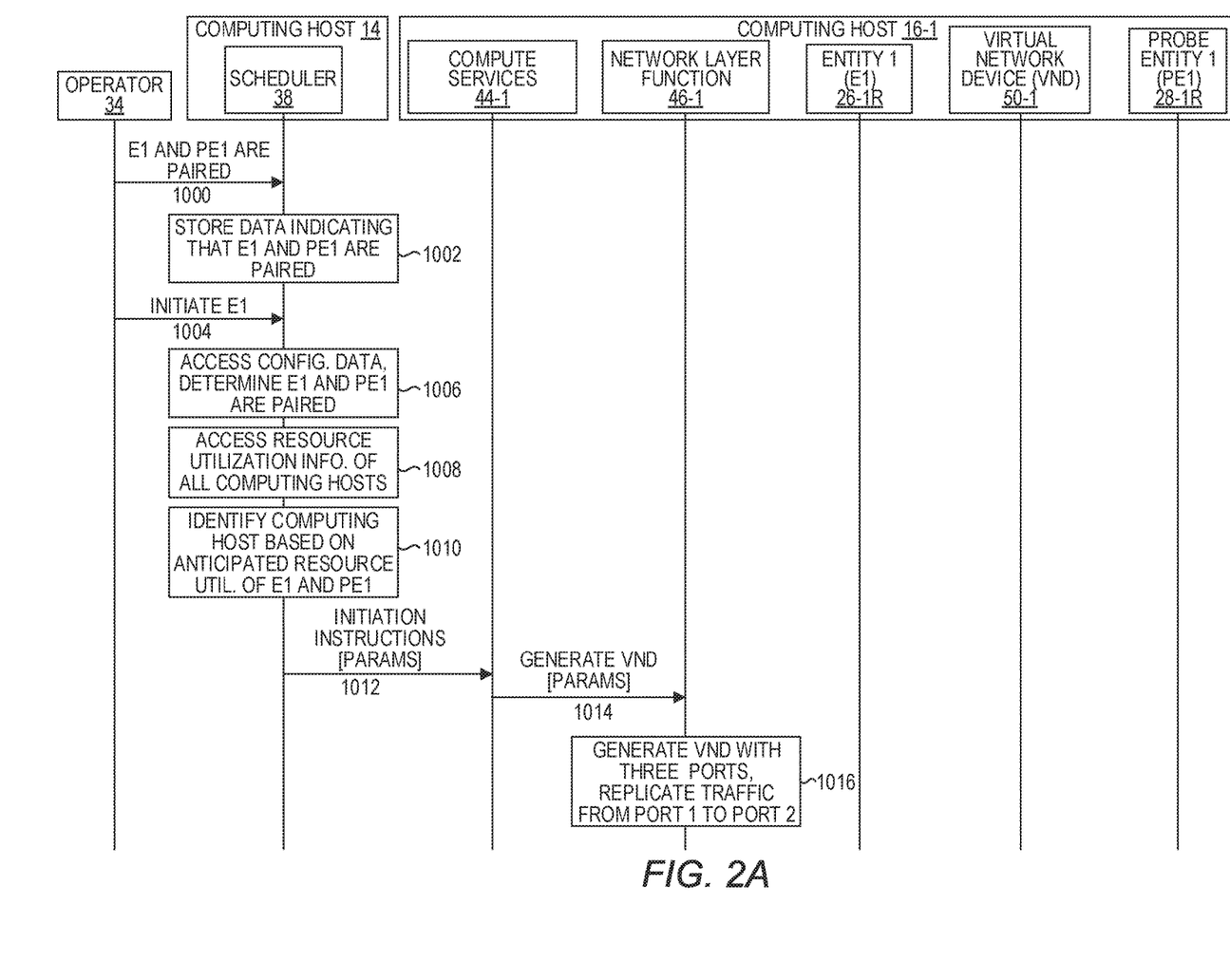
FIGS. 2A-2B illustrate a message sequence diagram showing messages between components in the cloud computing environment illustrated in FIG. 1, and actions taken by such components, to implement pairing a probe entity with another entity according to one implementation.
Figure 2B:
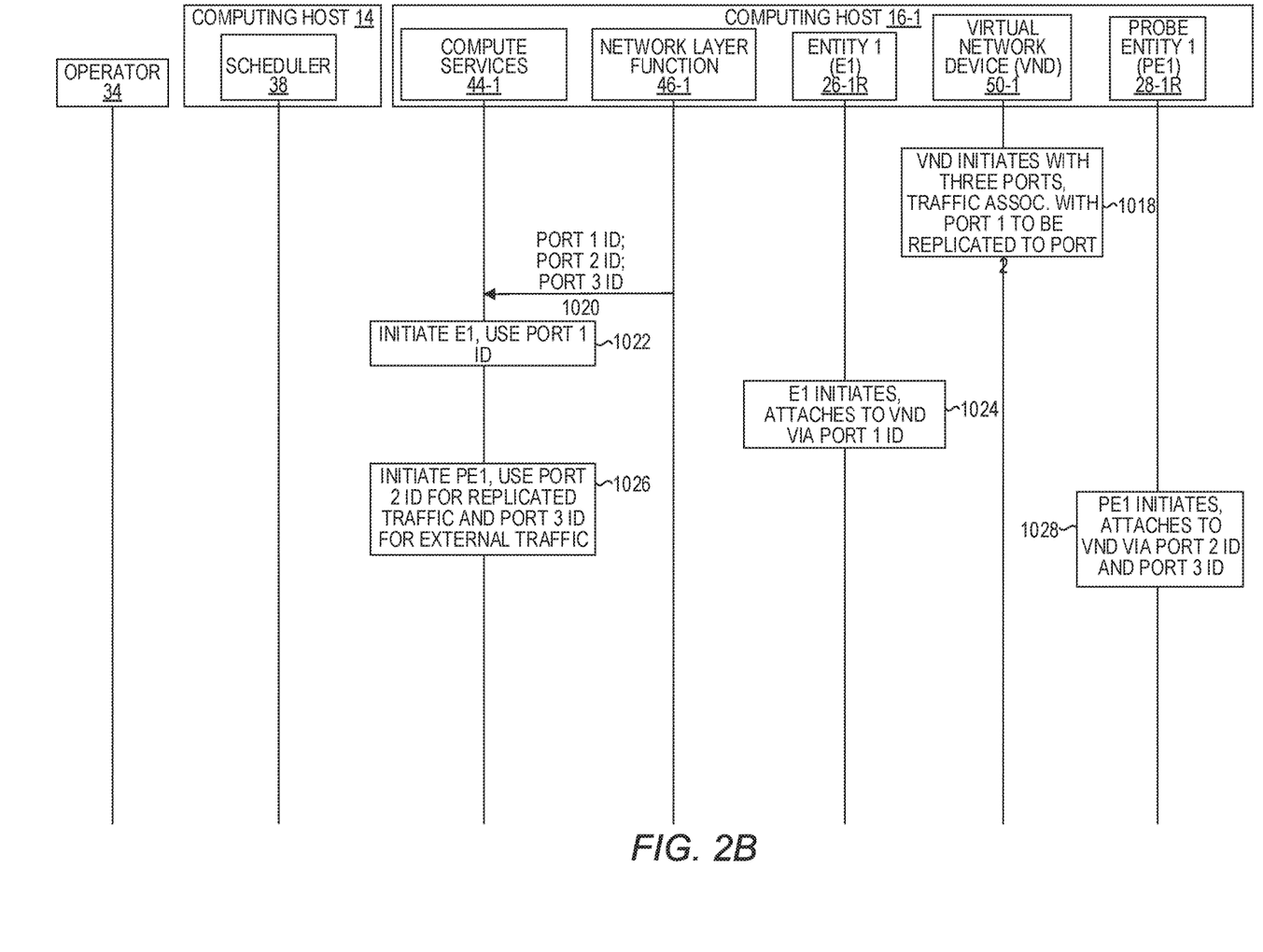

FIGS. 2A-2B illustrate a message sequence diagram showing messages between components in the cloud computing environment 10 illustrated in FIG. 1, and actions taken by such components, to implement the pairing of a probe entity with another entity according to one implementation. FIGS. 2A-2B will be discussed in conjunction with FIG. 1. Referring first to FIG. 2A, the operator 34 sends a command, via the operations controller 32, to the scheduler 38 to pair the entity 26-1 with the probe entity 28-1 (FIG. 2A, block 1000). The scheduler 38 receives the command, and stores the entry 42-1 in the configuration data 40 that indicates that the entity 26-1 is paired with the probe entity 28-1 (FIG. 2A, block 1002). The operator 34 subsequently, via the operations controller 32, sends a message to the scheduler 38 to initiate the entity 26-1 (FIG. 2A, block 1004). The operator 34 may be unaware of or have forgotten about the relationship between the entity 26-1 and the probe entity 28-1.

The scheduler 38 accesses the configuration data 40 and, based on the entry 42-1, determines that the entity 26-1 is paired with the probe entity 28-1 (FIG. 2A, block 1006). The scheduler 38 accesses resource utilization information associated with the computing hosts 16 (FIG. 2A, block 1008). For example, the scheduler 38 may send each of the computing hosts 16 a request to provide the current resource utilization information of the respective computing host 16, such as processor utilization, memory utilization, network utilization, and the like. Each computing host 16, in response, provides the scheduler 38 the requested resource utilization information.

The scheduler 38 analyzes the resource utilization information in conjunction with the anticipated resource utilization of both the entity 26-1 and the probe entity 28-1. The anticipated resource utilization of both the entity 26-1 and the probe entity 28-1 may be identified in configuration data, or other metadata, associated with the entity 26-1 and the probe entity 28-1. Based on the resource utilization information of the computing hosts 16 and the anticipated resource utilization of both the entity 26-1 and the probe entity 28-1, the scheduler 38 identifies the computing host 16-1 as the best computing host 16 on which to initiate the entity 26-1 and the probe entity 28-1 (FIG. 2A, block 1010).

The scheduler 38 sends initiation instructions to the compute services 44-1 (FIG. 2A, block 1012). The initiation instructions instruct the compute services 44-1 to initiate both the entity 26-1 and the probe entity 28-1, and to cause the generation of a first port, a replication port to which traffic associated with the first port is replicated, and a third port for external traffic on a virtual network device. The initiation instructions also instruct the compute services 44-1 to couple the entity 26-1 to the first port, and to couple the probe entity 28-1 to the replication port and the third port. The compute services 44-1 receives the initiation instructions, and sends a request to the network layer function 46-1 to generate a first port, a replication port to which traffic associated with the first port is replicated, and a third port for external communications on a virtual network device (FIG. 2A, block 1014).

The network layer function 46-1 generates the virtual network device 50-1 with the three ports 52-1, 52-2, and 52-3 and configures the virtual network device 50-1 to provide all traffic associated with the port 52-1 to the port 52-2 (FIG. 2A, block 1016). In other situations, a suitable virtual network device may already be initiated on the computing host 16-1, and the network layer function 46-1 need not generate a new virtual network device, but need only generate three new ports on an existing virtual network device. Referring now to FIG. 2B, the VND 50-1 initiates with the three ports 52-1-52-3 (FIG. 2B, block 1018). The network layer function 46-1 sends a port identifier of the port 52-1, a port identifier of the replication port 52-2, and a port identifier of the port 52-3 to the compute services 44-1 (FIG. 2B, block 1020).

The compute services 44-1 initiates the entity 26-1R (which is the runtime implementation of the entity 26-1) with the first port identifier (FIG. 2B, block 1022). The entity 26-1R initiates and attaches to the VND 50-1 via the port 52-1 (FIG. 2B, block 1024). The compute services 44-1 initiates the probe entity 28-1R (which is the runtime implementation of the probe entity 28-1) with the second port identifier and the third port identifier (FIG. 2B, block 1026). The probe entity 28-1R initiates and attaches to the VND 50-1 via the port 52-2 and the port 52-3 (FIG. 2B, block 1028). Thereafter, the entity 26-1R implements the functionality with which the entity 26-1R is configured. The VND 50-1 provides the probe entity 28-1R with all packets associated with the port 52-1, and the probe entity 28-1R analyzes such packets.

Figure 3:
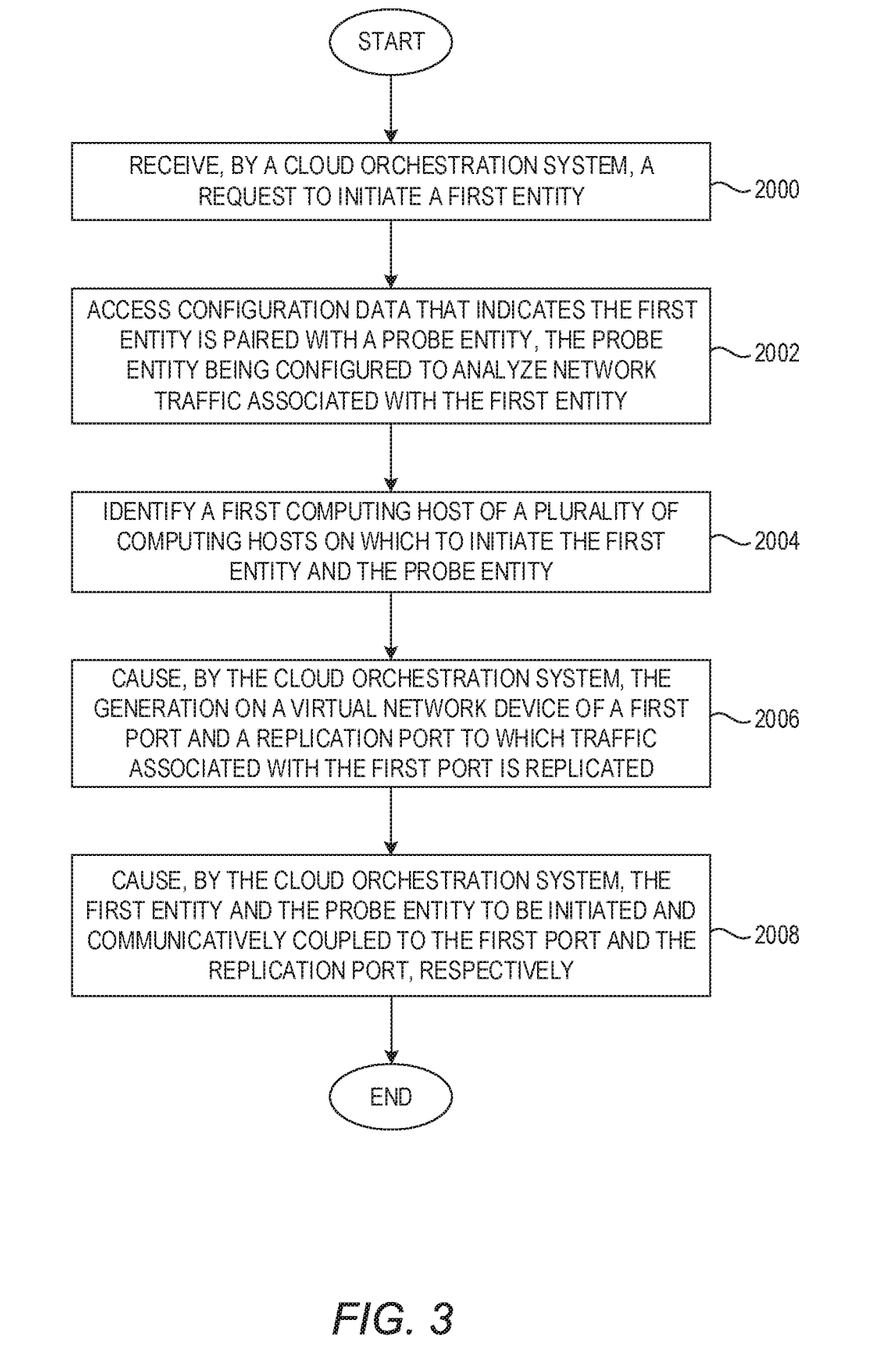
FIG. 3 is a flowchart of a method for pairing of a probe entity with another entity in a cloud computing environment according to one implementation.

FIG. 3 is a flowchart of a method for pairing a probe entity with another entity in a cloud computing environment according to one implementation. FIG. 3 will be discussed in conjunction with FIG. 1. The COS 12 receives a request to initiate the entity 26-1 (FIG. 3, block 2000). The COS 12 accesses the configuration data 40 that indicates the entity 26-1 is paired with the probe entity 28-1, the probe entity 28-1 being configured to analyze network traffic associated with the entity 26-1 (FIG. 3, block 2002). The COS 12 identifies the computing host 16-1 of the plurality of computing hosts 16 on which to initiate the entity 26-1 and the probe entity 28-1 (FIG. 3, block 2004). The COS 12 causes the generation on the virtual network device 50-1 of the port 52-1 and the replication port 52-2 to which traffic associated with the port 52-1 is replicated (FIG. 3, block 2006). The COS 12 causes the entity 26-1R and the probe entity 28-1R to be initiated and communicatively coupled to the port 52-1 and the replication port 52-2, respectively (FIG. 3, block 2008).

Figure 4:
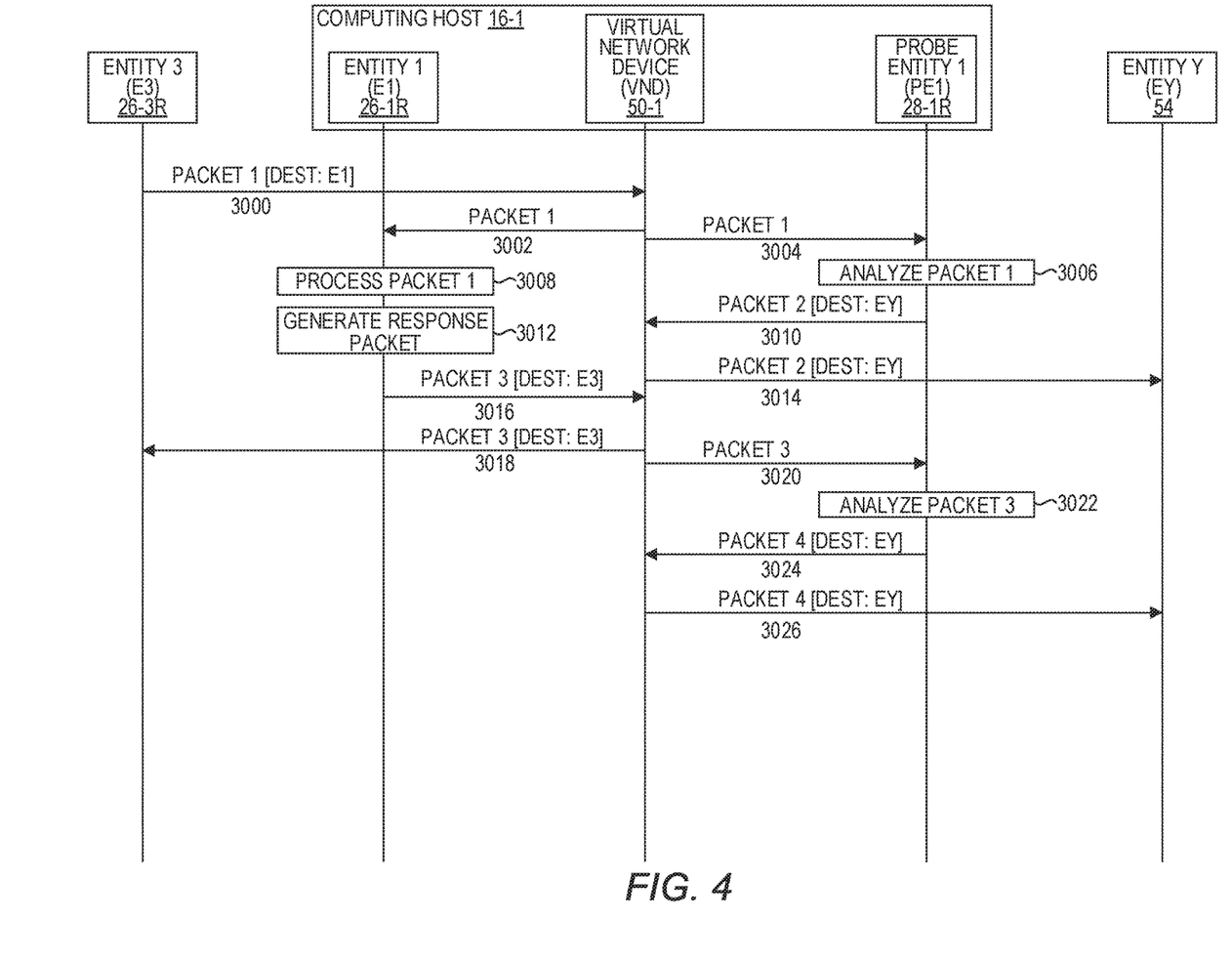
FIG. 4 is a message sequence diagram showing messages between components in the environment illustrated in FIG. 1, and actions taken by such components, when a probe entity and another entity process packets, according to one implementation.

FIG. 4 is a message sequence diagram showing messages between components in the environment illustrated in FIG. 1, and actions taken by such components, when the entity 26-1R and the probe entity 28-1R process packets, according to one implementation. Assume that the entity 26-3R sends a packet destined for the entity 26-1R (e.g., the packet has a destination address of the entity 26-1R). The packet is received by the VND 50-1 (FIG. 4, block 3000). The VND 50-1 sends the packet to the port 52-1, to thereby communicate the packet to the entity 26-1R (FIG. 4, block 3002). Substantially concurrently, the VND 50-1 also provides the packet to the port 52-2, to thereby communicate the same packet to the probe entity 28-1R, even though the packet was not addressed to the probe entity 28-1R (FIG. 4, block 3004). The probe entity 28-1R analyzes the packet (FIG. 4, block 3006). The entity 26-1R processes the packet in accordance with whatever functionality the entity 26-1R implements (FIG. 4, block 3008). In response to analyzing the packet, the probe entity 28-1R transmits a packet that has a destination address of an entity 54, which may be in the cloud computing environment 10, or may be external to the cloud computing environment 10 (FIG. 4, block 3010). The packet may simply be a copy of the packet received by the probe entity 28-1R, may be data that is based on analyzing the packet received by the probe entity 28-1R, or may be both.

The entity 26-1R generates a response packet (FIG. 4, block 3012). The VND 50-1 sends the packet received from the probe entity 28-1R toward the entity 54 (FIG. 4, block 3014). The entity 26-1R transmits the response packet with a destination address of the entity 26-3R (FIG. 4, block 3016). The response packet is received by the VND 50-1 and sent toward the entity 26-3R (FIG. 4, block 3018). The VND 50-1 also, substantially concurrently, provides the response packet to the port 52-2, to thereby communicate the packet to the probe entity 28-1R, even though the response packet was not addressed to the probe entity 28-1R (FIG. 4, block 3020). The probe entity 28-1R analyzes the response packet (FIG. 4, block 3022). In response to the response packet, the probe entity 28-1R transmits a packet that has a destination address of the entity 54 (FIG. 4, block 3024). The VND 50-1 sends the packet received from the probe entity 28-1R toward the entity 54 (FIG. 4, block 3026).

Figure 5:
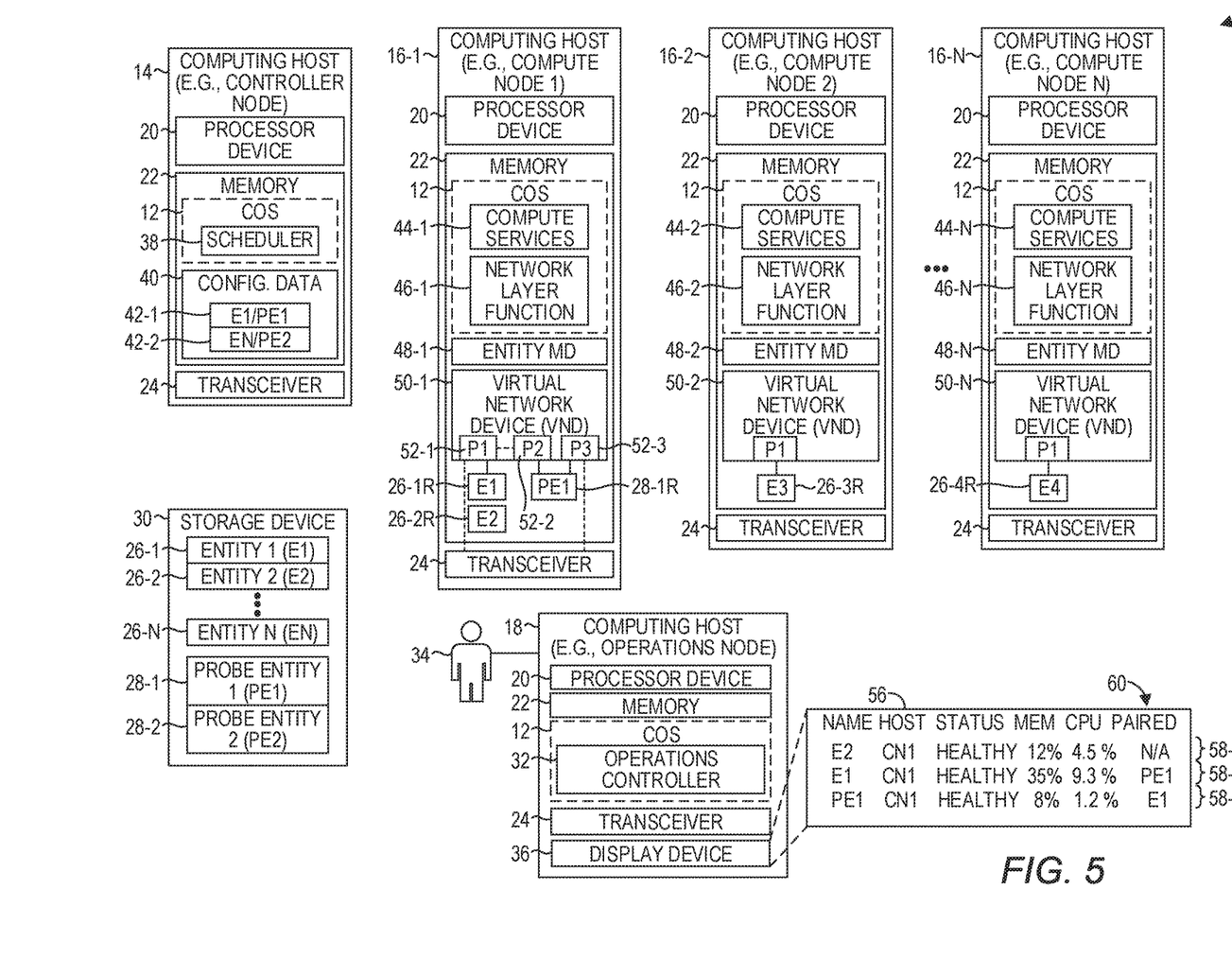
FIG. 5 is a block diagram of the cloud computing environment illustrated in FIG. 1 illustrating output of an operations controller in response to user input from an operator, according to one implementation.

FIG. 5 is a block diagram of the cloud computing environment 10 illustrating output of the operations controller 32 in response to user input from the operator 34, according to one implementation. In particular, the operator 34, via a user interface (UI) (not illustrated) presented by the operations controller 32, has requested information regarding entities executing on the computing host 16-1. In response, the operations controller 32 communicates with the compute services 44-1, requesting the status of the entities executing on the computing host 16-1. The compute services 44-1 accesses the entity metadata 48-1, and other available information about the entities 26-1R and 26-2R, and the probe entity 28-1R, and provides the information to the operations controller 32. The operations controller 32 generates output 56, and presents the output 56 on the display device 36. The output 56 includes rows 58-1-58-3. The row 58-1 provides information about the entity 26-2R, the row 58-2 provides information about the entity 26-1R, and the row 58-3 provides information about the probe entity 28-1R. Each row 58-1-58-3 includes a paired field 60, which identifies any entity to which the respective entity is paired. The paired field 60 of the row 58-2 indicates that the entity 26-1R is paired with the probe entity 28-1R, and the paired field 60 of the row 58-3 indicates that the probe entity 28-1R is paired with the entity 26-1R. In this manner, the operator 34 can easily and intuitively determine which entities are paired with which other entities.

There are times when the COS 12 automatically, or in response to operator input, migrates an entity from one computing host 16 to another computing host 16. This may occur for any number of reasons, such as a need to shut down a computing host 16 for maintenance or repair, or when a computing host 16 cannot provide a desired performance level due to being overloaded with entities, or upon request by the operator 34. Such migration may be a live migration wherein the entity continues to execute on the first computing host up until a particular point in time, and then transitions to the second computing host with little or no interruption from the perspective of a user of the entity. Alternatively, the migration may not be a live migration, wherein the entity is shut down on one computing host, and subsequently reinitiated on the second computing host.

Figure 6:
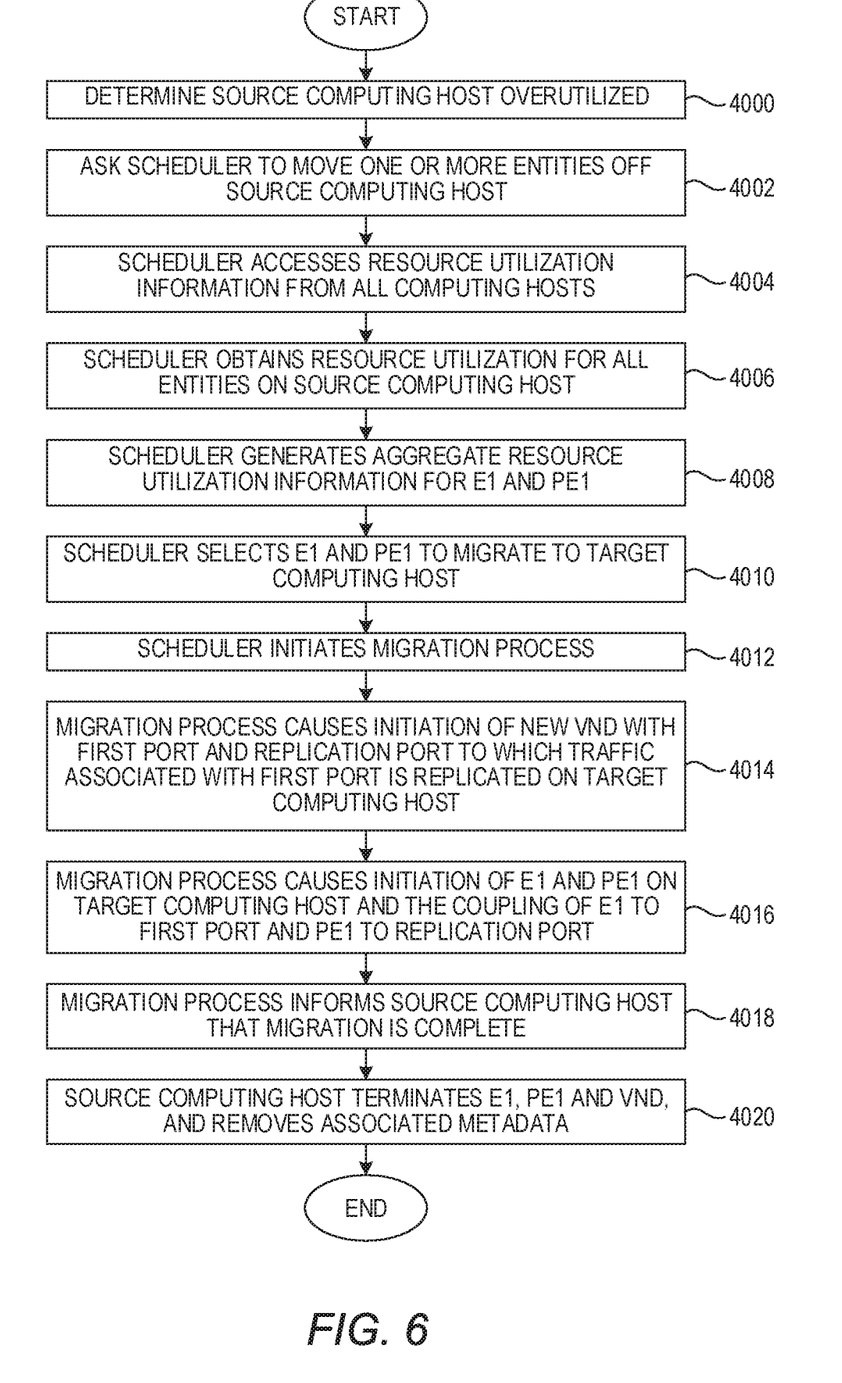
FIG. 6 is a flowchart of a method for migrating an entity and a paired probe entity from one computing host to another computing host according to one implementation.

FIG. 6 is a flowchart of a method for migrating an entity and a paired probe entity from one computing host to another computing host according to one implementation. In this example, assume that the compute services 44-1 determines that the computing host 16-1 is overutilized (FIG. 6, block 4000). Overutilization may be defined, for example, by a minimum amount of available memory, a processor utilization, a network utilization, or some other metric or metrics. The compute services 44-1 sends a message to the scheduler 38 requesting that the scheduler 38 migrate one or more migratable entities from the computing host 16-1 (referred to as "source computing host" in FIG. 6) to another computing host 16 (referred to as "target computing host" in FIG. 6) (FIG. 6, block 4002). The term "migratable" in this context means any running process on the computing host 16-1 that can be terminated on the computing host 16-1 and executed on another computing host 16 to provide the same services as were provided on the computing host 16-1. The entities 26 and the probe entities 28 are all migratable entities.

The scheduler 38 accesses resource utilization information from all the computing hosts 16 (FIG. 6, block 4004). The scheduler 38 obtains resource utilization information that identifies resource utilization for the migratable entities 26-1R, 28-1R and 26-2R executing on the computing host 16-1 (FIG. 6, block 4006). The scheduler 38 determines that the entity 26-1R and the probe entity 28-1R are an entity pair. The scheduler 38 generates aggregate resource utilization information for the entity 26-1R and the probe entity 28-1R that is based on the resource utilization associated with the entity 26-1R and the resource utilization associated with the probe entity 28-1R (FIG. 6, block 4008).

Based on the aggregate resource utilization for entity 26-1R and the probe entity 28-1R, the resource utilization information associated with the entity 26-2R, and the resource utilization information associated with the other computing hosts 16, the scheduler 38 selects the entity 26-1R and the probe entity 28-1R for migration to the computing host 16-2 (FIG. 6, block 4010). The scheduler 38 does resource booking of the required resources on the computing host 16-2. The scheduler 38 initiates, or causes the initiation of, a migration agent to migrate the entity 26-1R and the probe entity 28-1R for migration to the computing host 16-2 (FIG. 6, block 4012).

The migration process causes the initiation of a virtual network device with a first port and a replication port to which traffic associated with the first port is replicated on the computing host 16-2 (FIG. 6, block 4014). This may be accomplished, for example, by suitable instructions to the compute services 44-2. The migration process then migrates the entity 26-1R and the probe entity 28-1R to the computing host 16-2 by causing the initiation of the entity 26-1R and the probe entity 28-1R on the computing host 16-2, and causing the entity 26-1R to be communicatively coupled to the first port and the probe entity 28-1R to be communicatively coupled to the replication port (FIG. 6, block 4016). The migration process informs the compute services 44-1 that migration is complete (FIG. 6, block 4018). The compute services 44-1 terminates the entity 26-1R and the probe entity 28-1R on the computing host 16-1, instructs the network layer function 46-1 to delete the ports 52-1 and 52-2, and deletes the entity metadata 48-1 that is associated with the entity 26-1R and the probe entity 28-1R (FIG. 6, block 4020).

Figure 7:
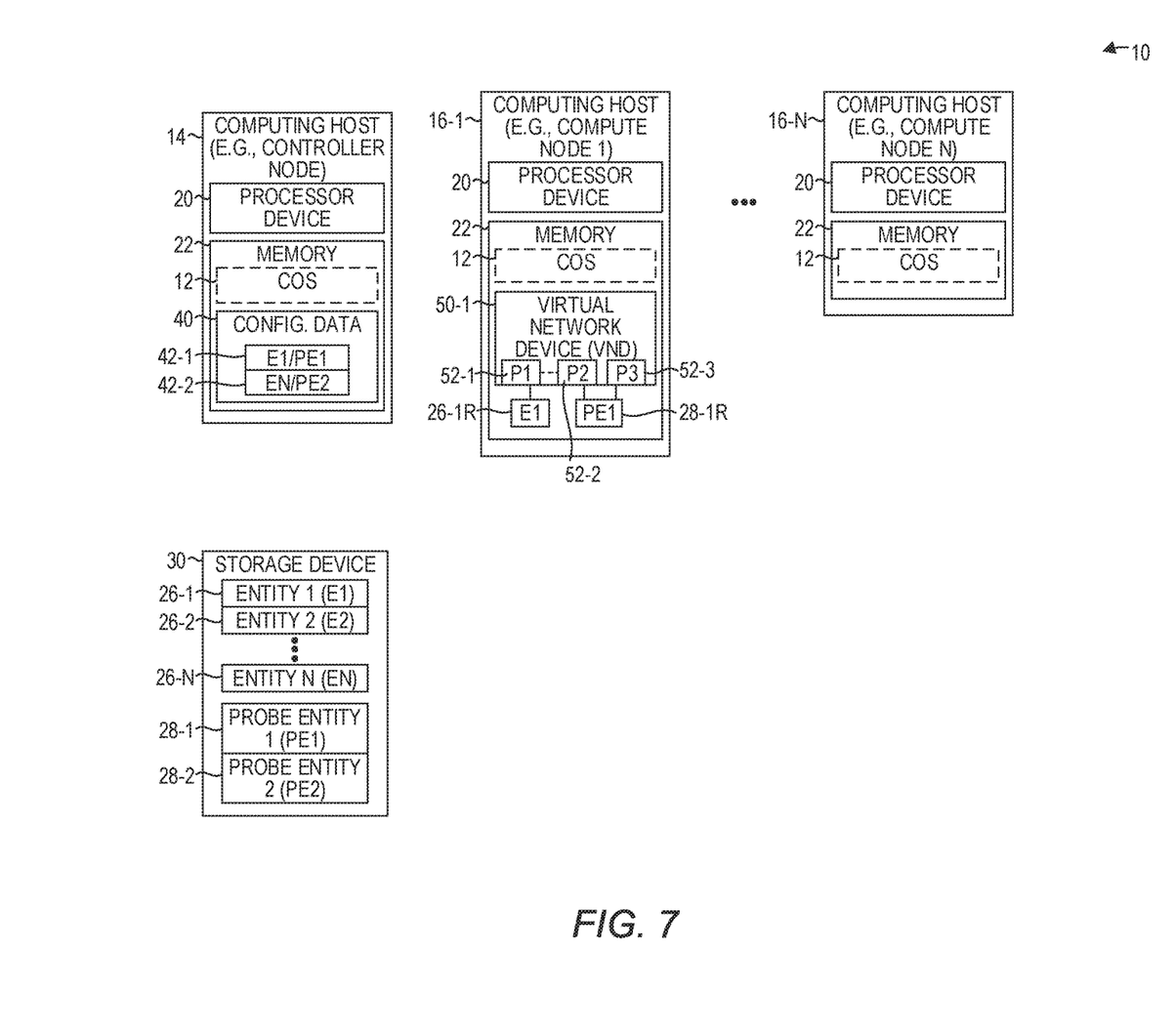
FIG. 7 is a simplified block diagram of the cloud computing environment illustrated in FIG. 1 according to one implementation.

FIG. 7 is a simplified block diagram of the cloud computing environment 10 illustrated in FIG. 1 according to one implementation. The cloud computing environment 10 includes the COS 12, which includes the memories 22 and the processor devices 20 coupled to corresponding memories 22. The processor devices 20 are to receive a request to initiate the entity 26-1. The processor devices 20 are further to access the configuration data 40 that indicates the entity 26-1 is paired with the probe entity 28-1, the probe entity 28-1 being configured to analyze network traffic associated with the entity 26-1. The processor devices 20 are to identify the computing host 16-1 of the plurality of computing hosts 16 on which to initiate the entity 26-1 and the probe entity 28-1. The processor devices 20 are to cause the generation on the virtual network device 50-1 of the port 52-1 and the replication port 52-2, to which traffic associated with the port 52-1 is replicated. The processor devices 20 are to cause the entity 26-1R and the probe entity 28-1R to be initiated and communicatively coupled to the port 52-1 and the replication port 52-2, respectively.

Figure 8:
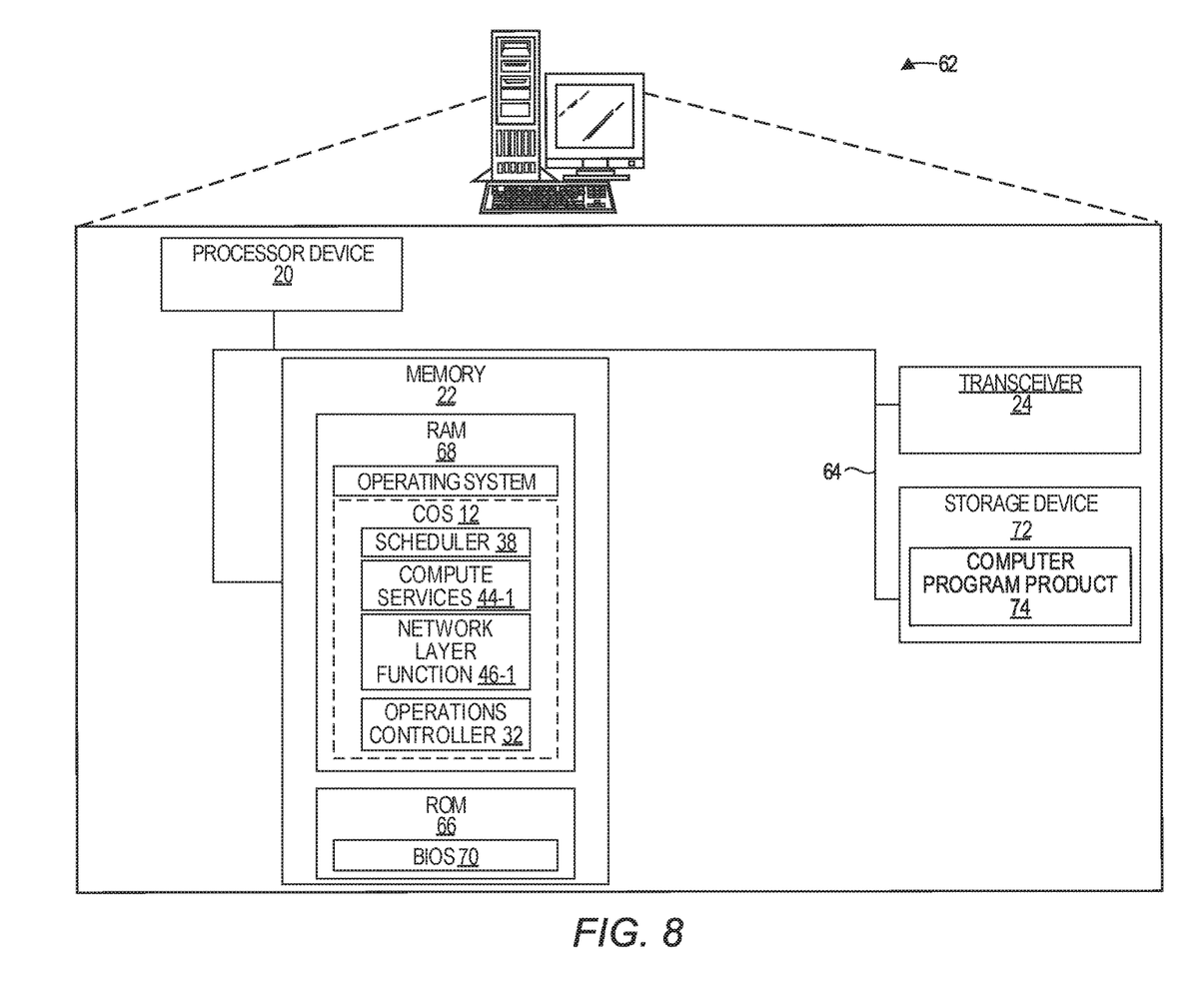
FIG. 8 is a block diagram of a computing host suitable for implementing any of the examples illustrated herein.

FIG. 8 is a block diagram of a computing host 62 suitable for implementing the COS 12 on any of the computing hosts 14, 16, or 18 disclosed herein. The computing host 62 may comprise any computing or electronic device capable of including firmware, hardware, and/or executing software instructions to implement the functionality described herein, such as a computer server, a desktop computing device, a laptop computing device, or the like. The computing host 62 includes the processor device 20, the memory 22, and a system bus 64. The system bus 64 provides an interface for system components including, but not limited to, the memory 22 and the processor device 20. The processor device 20 can be any commercially available or proprietary processor.

The memory 22 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing host 62. The volatile memory 68 may also include a high-speed RAM, such as static RAM, for caching data.

The computing host 62 may further include or be coupled to a non-transitory computer-readable storage medium such as a storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like.

A number of modules can be stored in the storage device 72 and in the volatile memory 68, including an operating system and one or more program modules, such as the scheduler 38, the compute services 44-1, the network layer function 46-1, or the operations controller 32, which collectively may implement the functionality described herein in whole or in part.

All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20.

The operator 34 may also be able to enter one or more configuration commands through a keyboard (not illustrated), a pointing device such as a mouse (not illustrated), or a touch-sensitive surface such as the display device 36 (not illustrated). The computing host 62 may also include the transceiver 24 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a cloud orchestration system, a request to initiate a first entity, the first entity being a first container or a first virtual machine;
   accessing configuration data that indicates the first entity is paired with a probe entity, the probe entity being configured to analyze network traffic associated with the first entity, the probe entity being a probe container or a probe virtual machine;
   identifying a first computing host of a plurality of computing hosts on which to initiate the first entity and the probe entity;
   causing, by the cloud orchestration system, the generation on a virtual network device of a first port and a replication port to which traffic associated with the first port is replicated; and
   causing, by the cloud orchestration system, the first entity and the probe entity to be initiated and communicatively coupled to the first port and the replication port, respectively.

2. The method of claim 1 wherein causing, by the cloud orchestration system, the generation on the virtual network device of the first port and the replication port to which traffic associated with the first port is replicated, comprises:
   sending, by a compute services of the cloud orchestration system, a request to a network layer function to generate the virtual network device with the first port and the replication port; and
   receiving, by the compute services from the network layer function, a first port identifier and a replication port identifier; and
   wherein causing, by the cloud orchestration system, the first entity and the probe entity to be initiated and communicatively coupled to the first port and the replication port, respectively further comprises:
   initiating, by the compute services, the first entity with the first port identifier; and
   initiating, by the compute services, the probe entity with the replication port identifier.

3. The method of claim 1 wherein the first entity comprises the first virtual machine and the probe entity comprises the probe virtual machine.

4. The method of claim 1 wherein identifying the first computing host on which to initiate the first entity and the probe entity comprises:
   accessing resource utilization information associated with each computing host of the plurality computing hosts;
   determining an anticipated resource utilization for both the first entity and the probe entity; and
   based on the resource utilization information associated with each computing host of the plurality of computing hosts and the anticipated resource utilization for both the first entity and the probe entity, identifying the first computing host on which to initiate the first entity and the probe entity.

5. The method of claim 1 further comprising:
   receiving, by the cloud orchestration system, user input that requests information regarding entities executing on the first computing host;
   in response to the user input, accessing entity metadata that identifies each entity executing on the first computing host; and
   presenting, on a display device, information identifying the entities executing on the first computing host, the information including information that identifies the first entity and the probe entity as being paired with each other.

6. The method of claim 1 further comprising:
   making a determination that the first computing host is overutilized;
   in response to the determination, accessing resource utilization information that identifies resource utilization of each migratable entity executing on the first computing host;
   determining that the first entity and the probe entity are migratable entities and are an entity pair;
   generating aggregate resource utilization for the entity pair that is based on the resource utilization associated with the first entity and the resource utilization associated with the probe entity; and
   selecting, based on the aggregate resource utilization for the entity pair and the resource utilization information associated with every other migratable entity executing on the first computing host, a second computing host to which to migrate the first entity and the probe entity.

7. The method of claim 1 further comprising:
making a determination to migrate the first entity to a second computing host;
causing, by the cloud orchestration system on the second computing host, the initiation of a second virtual network device with a first port and a replication port to which traffic associated with the first port is replicated; and
causing, by the cloud orchestration system on the second computing host, the first entity and the probe entity to be initiated and communicatively coupled to the first port and the replication port of the second virtual network device, respectively.

8. The method of claim 7 further comprising:
removing, by the cloud orchestration system, the first entity and the probe entity from the first computing host; and
removing, by the cloud orchestration system, the virtual network device on the first computing host.

9. A cloud orchestration system, comprising:
a memory; and
one or more processor devices coupled to the memory to:
receive a request to initiate a first entity, the first entity being a first container or a first virtual machine;
access configuration data that indicates the first entity is paired with a probe entity, the probe entity being configured to analyze network traffic associated with the first entity, the probe entity being a probe container or a probe virtual machine;
identify a first computing host of a plurality of computing hosts on which to initiate the first entity and the probe entity;
cause the generation on a virtual network device of a first port and a replication port to which traffic associated with the first port is replicated; and
cause the first entity and the probe entity to be initiated and communicatively coupled to the first port and the replication port, respectively.

10. The cloud orchestration system of claim 9 wherein to cause the generation on the virtual network device of the first port and the replication port to which traffic associated with the first port is replicated, the one or more processor devices are further to:
send a request to a network layer function to generate the virtual network device with the first port and the replication port; and
receive, from the network layer function, a first port identifier and a replication port identifier; and
wherein to cause the first entity and the probe entity to be initiated and communicatively coupled to the first port and the replication port, respectively, the one or more processor devices are further to:
initiate the first entity with the first port identifier; and
initiate the probe entity with the replication port identifier.

11. The cloud orchestration system of claim 9 wherein the first entity comprises the first virtual machine and the probe entity comprises the probe virtual machine.

12. The cloud orchestration system of claim 9 wherein the one or more processor devices are further to:
receive user input that requests information regarding entities executing on the first computing host;
in response to the user input, access entity metadata that identifies each entity executing on the first computing host; and
present, on a display device, information identifying the entities executing on the first computing host, the information including information that identifies the first entity and the probe entity as being paired with each other.

13. The cloud orchestration system of claim 9 wherein the one or more processor devices are further to:
make a determination that the first computing host is overutilized;
in response to the determination, access resource utilization information that identifies resource utilization of each migratable entity executing on the first computing host;
determine that the first entity and the probe entity are migratable entities and are an entity pair;
generate aggregate resource utilization for the entity pair that is based on the resource utilization associated with the first entity and the resource utilization associated with the probe entity; and
select, based on the aggregate resource utilization for the entity pair and the resource utilization information associated with every other migratable entity executing on the first computing host, a second computing host to which to migrate the first entity and the probe entity.

14. The cloud orchestration system of claim 9 wherein the one or more processor devices are further to:
make a determination to migrate the first entity to a second computing host;
cause, on the second computing host, the initiation of a second virtual network device with a first port and a replication port to which traffic associated with the first port is replicated; and
cause, on the second computing host, the first entity and the probe entity to be initiated and communicatively coupled to the first port and the replication port of the second virtual network device, respectively.

15. A non-transitory computer-readable storage medium that comprises instructions configured to cause one or more processor devices to:
receive, by a cloud orchestration system, a request to initiate a first entity, the first entity being a first container or a first virtual machine;
access configuration data that indicates the first entity is paired with a probe entity, the probe entity being configured to analyze network traffic associated with the first entity, the probe entity being a probe container or a probe virtual machine;
identify a first computing host of a plurality of computing hosts on which to initiate the first entity and the probe entity;
cause the generation on a virtual network device of a first port and a replication port to which traffic associated with the first port is replicated; and
cause the first entity and the probe entity to be initiated and communicatively coupled to the first port and the replication port, respectively.

16. The non-transitory computer-readable storage medium of claim 15 wherein to cause the generation on the virtual network device of the first port and the replication port to which traffic associated with the first port is replicated, the instructions further cause the one or more processor devices to:
send a request to a network layer function to generate the virtual network device with the first port and the replication port; and
receive, from the network layer function, a first port identifier and a replication port identifier; and
wherein to cause the first entity and the probe entity to be initiated and communicatively coupled to the first port and the replication port, respectively, the instructions further cause the one or more processor devices to:

initiate the first entity with the first port identifier; and initiate the probe entity with the replication port identifier.

17. The non-transitory computer-readable storage medium of claim 15 wherein the first entity comprises the first virtual machine and the probe entity comprises the probe virtual machine.

18. The non-transitory computer-readable storage medium of claim 15 wherein the instructions further cause the one or more processor devices to:

receive user input that requests information regarding entities executing on the first computing host;

in response to the user input, access entity metadata that identifies each entity executing on the first computing host; and present, on a display device, information identifying the entities executing on the first computing host, the information including information that identifies the first entity and the probe entity as being paired with each other.

19. The non-transitory computer-readable storage medium of claim 15 wherein the instructions further cause the one or more processor devices to:

make a determination that the first computing host is overutilized;

in response to the determination, access resource utilization information that identifies resource utilization of each migratable entity executing on the first computing host;

determine that the first entity and the probe entity are migratable entities and are an entity pair;

generate aggregate resource utilization for the entity pair that is based on the resource utilization associated with the first entity and the resource utilization associated with the probe entity; and select, based on the aggregate resource utilization for the entity pair and the resource utilization information associated with every other migratable entity executing on the first computing host, a second computing host to which to migrate the first entity and the probe entity.

20. The non-transitory computer-readable storage medium of claim 15 wherein the instructions further cause the one or more processor devices to:

make a determination to migrate the first entity to a second computing host;

cause, on the second computing host, the initiation of a second virtual network device with a first port and a replication port to which traffic associated with the first port is replicated; and cause, on the second computing host, the first entity and the probe entity to be initiated and communicatively coupled to the first port and the replication port of the second virtual network device, respectively.

* * * * *